US008248732B2

(12) United States Patent
Nishiyama et al.

(10) Patent No.: US 8,248,732 B2
(45) Date of Patent: Aug. 21, 2012

(54) HEAD-GIMBAL ASSEMBLY INCLUDING A TRANSMISSION-LINE STRUCTURE FOR HIGH-DENSITY MAGNETIC RECORDING (75) Inventors: Nobumasa Nishiyama, Kanagawa (JP); Yohji Maruyama, Saitama (JP)

(73) Assignee: Hitachi Global Storage Technologies, Netherlands B.V., Amsterdam (NL)

( * ) Notice: Subject to any disclaimer, the term of this patent is extended or adjusted under 35 U.S.C. 154(b) by 0 days.

(21) Appl. No.: 12/564,885

(22) Filed: Sep. 22, 2009

(65) Prior Publication Data
US 2011/0090602 A1 Apr. 21, 2011

(30) Foreign Application Priority Data
Sep. 22, 2008 (JP) .................. 2008-243418

(51) Int. Cl.
*G11B 5/48* (2006.01)
*G11B 21/16* (2006.01)
(52) U.S. Cl. .................. 360/245.9
(58) Field of Classification Search ............... 360/245.9, 360/246
See application file for complete search history.

(56) References Cited

U.S. PATENT DOCUMENTS

| 4,819,094 | A | * | 4/1989 | Oberg .................. 360/245.9 |
| 5,680,274 | A | * | 10/1997 | Palmer .................. 360/245.9 |
| 6,268,981 | B1 | * | 7/2001 | Coon et al. ............. 360/244.3 |
| 6,288,877 | B1 | * | 9/2001 | Khan et al. ............. 360/245.9 |
| 6,785,092 | B2 | | 8/2004 | Covington et al. |
| 6,801,402 | B1 | * | 10/2004 | Subrahmanyam et al. 360/245.9 |
| 7,054,110 | B2 | * | 5/2006 | Nakamura et al. ......... 360/264.2 |
| 7,092,215 | B2 | * | 8/2006 | Someya et al. ............... 360/246 |
| 7,697,237 | B1 | * | 4/2010 | Danielson .................. 360/245.9 |
| 7,782,571 | B2 | * | 8/2010 | Ishii et al. .................. 360/245.8 |
| 7,903,376 | B2 | * | 3/2011 | Chang et al. ............... 360/245.9 |
| 2006/0187587 | A1 | * | 8/2006 | Arai et al. .................. 360/245.9 |
| 2007/0230059 | A1 | | 10/2007 | Ota et al. |
| 2008/0019040 | A1 | | 1/2008 | Zhu et al. |
| 2008/0062571 | A1 | | 3/2008 | Toukairin et al. |
| 2011/0255250 | A1 | * | 10/2011 | Dinh et al. .................. 361/749 |

FOREIGN PATENT DOCUMENTS

| JP | 07-283579 | 10/1995 |
| JP | 08-125380 | 5/1996 |
| JP | 2002-222578 | 8/2002 |
| JP | 2003-124712 | 4/2003 |
| JP | 2005-525663 | 8/2005 |
| JP | 2006-024618 | 1/2006 |
| JP | 2008-159105 | 7/2008 |

* cited by examiner

*Primary Examiner* — Julie Anne Watko (57) ABSTRACT

A head-gimbal assembly. The head-gimbal assembly includes a suspension, a head-slider coupled to the suspension, a magnetic-recording assistance element on the head-slider for applying an electromagnetic wave to a magnetic-recording disk, and a transmission line on the suspension for transmitting signals to the magnetic-recording assistance element. The transmission line includes an electrically conductive line for transmitting the signals, an upper shield placed above the electrically conductive line along the electrically conductive line, a lower shield placed below the electrically conductive line along the electrically conductive line, and a plurality of columns arranged at each of a right side and a left side of the electrically conductive line along the electrically conductive line for connecting the upper shield and the lower shield. The plurality of columns arranged at the right and left sides includes, respectively, a right linear array of columns and a left linear array of columns.

11 Claims, 10 Drawing Sheets

HEAD-GIMBAL ASSEMBLY INCLUDING A TRANSMISSION-LINE STRUCTURE FOR HIGH-DENSITY MAGNETIC RECORDING

CROSS-REFERENCE TO RELATED APPLICATION

This application claims priority from the Japanese Patent Application No. 2008-243418, filed Sep. 22, 2008, the disclosure of which is incorporated herein in its entirety by reference.

TECHNICAL FIELD

Embodiments of the present invention relate to a head-gimbal assembly (HGA) including a transmission-line structure for high-density magnetic recording.

BACKGROUND

The information throughput of information-oriented society has been increasing rapidly. In particular, storage devices store increasing amounts of information at higher areal densities in devices of ever decreasing form factors. Thus, technology that provides increased storage capacity such as high-density magnetic recording has received increasing attention to satisfy the demand for increased storage capacity. To achieve high-density magnetic recording, more minute magnetic-recording bits are desired. To this end, the bit size of a unit of magnetically recorded information has continued to decrease in size with an attending rise in the density of information stored in high-density, magnetic-recording storage devices, such as hard-disk drives (HDDs).

However, the small bit sizes attending the development of high-density magnetic recording are impacted by reduced thermal stability of the magnetization of the small magnetic-recording bits in which information is stored so that magnetically recorded information fades away with time because of thermal decay, which adversely affects non-volatility of magnetically recorded information. Accordingly, to ensure the thermal stability of the magnetically recorded information, the coercivity of magnetic-recording media has increased. However, as is known in the art, the higher the coercivity is, the more difficult magnetic recording becomes. To perform magnetic recording on a high-coercivity magnetic-recording medium, a magnetic-recording field from a write element of a magnetic-recording head is provided that is greater than the coercivity of the magnetic-recording medium, and possesses a high magnetic-recording-field gradient. Although magnetic-recording head structures have been refined and new materials have been developed, magnetic recording within the small bit sizes attending high-density magnetic recording is becoming increasingly more challenging.

Thus, alternative magnetic-recording techniques have been proposed such as heat-assisted magnetic recording (HAMR), which applies heat to an area to be recorded utilizing a phenomenon that the magnetic-recording-medium coercivity reduces with the application of heat, which allows a magnetic-recording medium with high coercivity at room temperature to be written with a lower magnetic-recording field at a higher temperature. HAMR, however, only heats the magnetic-recording medium to reduce the coercivity; and, the magnetic-recording field from the write element of the magnetic-recording head still has to provide the high magnetic-recording-field gradient, which is the source of abrupt transitions between recorded bits attending high-density magnetic recording. In writing the magnetic-recording medium, the write element of the magnetic-recording head is brought close to the magnetic-recording medium in order to write the abrupt transitions. However, since a heat source utilized to heat the magnetic-recording medium is provided in the vicinity of the air-bearing surface (ABS) near the write element of the magnetic-recording head, the fly height can not be reduced because of the protrusion of the magnetic-recording head due to heating. Thus, engineers and scientists engaged in the development of high-density magnetic-recording are interested in finding new means for recording information at high areal densities.

SUMMARY

Embodiments of the present invention include a head-gimbal assembly. The head-gimbal assembly includes a suspension, a head-slider coupled to the suspension, a magnetic-recording assistance element on the head-slider for applying an electromagnetic wave to a magnetic-recording disk to assist magnetic recording on the magnetic-recording disk, and a transmission line on the suspension for transmitting signals to the magnetic-recording assistance element. The transmission line includes an electrically conductive line for transmitting the signals, an upper shield placed above the electrically conductive line along the electrically conductive line, a lower shield placed below the electrically conductive line along the electrically conductive line, and a plurality of columns arranged at each of a right side and a left side of the electrically conductive line along the electrically conductive line for connecting the upper shield and the lower shield. The plurality of columns arranged at the right side includes a right linear array of columns; and, the plurality of columns arranged at the left side includes a left linear array of columns.

DESCRIPTION OF THE DRAWINGS

The accompanying drawings, which are incorporated in and form a part of this specification, illustrate embodiments of the invention and, together with the description, serve to explain the embodiments of the present invention.

The drawings referred to in this description should not be understood as being drawn to scale except if specifically noted.

DESCRIPTION OF EMBODIMENTS

Reference will now be made in detail to the alternative embodiments of the present invention. While the invention will be described in conjunction with the alternative embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following description of embodiments of the present invention, numerous specific details are set forth in order to provide a thorough understanding of the present invention. However, it should be noted that embodiments of the present invention may be practiced without these specific details. In other instances, well known methods, procedures, and components have not been described in detail as not to unnecessarily obscure embodiments of the present invention. Throughout the drawings, like components are denoted by like reference numerals, and repetitive descriptions are omitted for clarity of explanation if not necessary.

Description of Embodiments of the Present Invention for a Head-Gimbal Assembly Including a Transmission-Line Structure for High-Density Magnetic-Recording With relevance to embodiments of the present invention, a magnetic-recording system which includes a first write magnetic pole for reversing a magnetic field according to a write signal and a second write magnetic pole for producing a high-frequency magnetic field may be used to obtain an effective magnetic reversal field which is stronger than the magnetic field from the first write magnetic pole by the synthetic magnetic field from both magnetic poles so that the second write magnetic pole assists in a magnetic-recording operation. High-frequency electromagnetic fields applied to a magnetic-recording medium allow magnetization reversal in magnetic-recording with smaller magnetic-recording fields than the coercivity of the magnetic-recording medium. A high-frequency electromagnetic field wobbles spins in the magnetic-recording medium to equivalently raise the energy potential of the spins. As a result, the energy to reverse the magnetic spins is reduced allowing magnetization reversal with a weaker magnetic-recording field than the coercivity of the magnetic-recording medium.

With further relevance to embodiments of the present invention, an electromagnetic wave of several tens of gigahertz (GHz) corresponding to a microwave is employed to wobble spins to raise the energy level. As described herein, microwaves are defined as electromagnetic waves from 3 to 300 GHz. In an embodiment of the present invention, electromagnetic waves from 10 to 50 GHz are used. Conventional transmission lines on suspensions are transmission systems for a little lower than 2 GHz at the highest. A device called a waveguide is generally used for transmitting signals of several tens of GHz. However, mounting a waveguide on a suspension which is designed to satisfy numerous mechanical constraints is difficult, if not, impossible. Additionally, in transmission by conventional microstrip lines, multiple reflections of the write signal may occur because of impedance mismatches that exist at ends and terminals of a conventional microstrip line, which results in radiation with a frequency corresponding to a round trip up and down the conventional microstrip line, as well as waveform distortion of the write signal.

With further relevance to embodiments of the present invention, in designing a transmission line structure on a suspension, the stiffness design has been found to be a factor in the performance of the transmission line. For example, a technique may be used to adjust the stiffness of a microstrip line structure by forming holes in a underlayer supporting the transmission line. Specifically, holes are formed in a metal layer in an area facing a hinge portion of a suspension. Accordingly, the stiffness of the line structure is reduced at the hinge portion to prevent the interference with the motion of the suspension at the hinge portion.

With further relevance to embodiments of the present invention, as described above, the conventional microstrip line with the holes formed in the underlayer supporting the transmission line to adjust the stiffness can mitigate waveform distortion caused by multiple reflection in write signals of several tens of GHz, by reducing the pitch of the holes. However, since the reduced pitch of the holes reduces the mechanical stiffness, the hole ratio, which is indicated by hole length divided by pitch, can not be increased. Accordingly, the area of the underlayer supporting the transmission line increases and a transmission loss caused by induced currents might not be reduced; as a result, precisely and efficiently transmitting signals of several tens of GHz is difficult, if not, impossible.

Thus, embodiments of the present invention provide a suitable signal transmission line structure which is capable of transmitting efficiently high-frequency signals of several tens of GHz without interfering with the movement of a suspension which supports a head-slider and allow satisfactory flight of the head-slider.

In accordance with embodiments of the present invention, a head-gimbal assembly (HGA) includes a suspension, a head-slider coupled to the suspension, a magnetic-recording assistance element on the head-slider for applying an electromagnetic wave to a magnetic-recording disk to assist magnetic recording on the magnetic-recording disk, and a transmission line on the suspension for transmitting signals to the magnetic-recording assistance element. The transmission line includes an electrically conductive line for transmitting the signals, an upper shield placed above the electrically conductive line along the electrically conductive line, a lower shield placed below the electrically conductive line along the electrically conductive line, and a plurality of columns arranged at each of a right side and a left side of the electrically conductive line along the electrically conductive line for connecting the upper shield and the lower shield. The plurality of columns arranged at the right side include a right linear array of columns that are arranged in a linear array of columns along the right side; and, the plurality of columns arranged at the left side include a left linear array of columns that are arranged in a linear array of columns along the left side. Thus, in accordance with embodiments of the present invention, the upper and lower shields connected with the plurality of columns provides efficient and precise transmission of high-frequency signals to the head-slider applying electromagnetic waves to the magnetic-recording disk to assist magnetic recording without interfering with the movement of the suspension supporting the head-slider and allowing the desired flight of the head-slider.

In an embodiment of the present invention, the lower shield is formed distinct from a base such that a portion of the suspension includes the base; and, the upper shield, the lower shield and the plurality of columns are made of metal with higher electrical conductivity than the base. Thus, embodiments of the present invention provide satisfactory transmission characteristics.

In another embodiment of the present invention, the plurality of columns have an identical shape; and, the left linear array of columns and the right linear array of columns have an identical arrangement pitch. Thus, an embodiment of the present invention allows for efficient and precise design of the transmission line. In another embodiment of the present invention, columns of the left linear array and columns of the right linear array are arranged at identical positions in a direction along the electrically conductive line, or alternatively, an offset in a direction along the electrically conductive line is provided between the left linear array of columns and the right linear array of columns. In another embodiment of the present invention, the offset is greater than a dimension of each column in the direction along the electrically conductive line. Thus, another embodiment of the present invention reduces the stiffness of the transmission line.

In an embodiment of the present invention, a dimension of a column of the plurality of columns in a direction along the electrically conductive line is less than or equal to $1/10$ of a distance between centers of adjacent columns. Thus, an embodiment of the present invention reduces detrimental effects from the columns on signal transmission characteristics. In another embodiment of the present invention, the signals are differential signals, and two electrically conductive lines for transmitting the signals are formed on a surface between the upper shield and the lower shield. Thus, another embodiment of the present invention enables efficient and precise transmission of high-frequency signals. In an embodiment of the present invention, a spacing between the right electrically conductive line of the two electrically conductive lines and the right linear array of columns and a spacing between the left electrically conductive line of the two electrically conductive lines and the left linear array of columns are an identical spacing, S2; and, a spacing, S1, between the two electrically conductive lines is no more than the spacing, S2. Thus, an embodiment of the present invention allows efficient and precise design of the transmission line.

In an embodiment of the present invention, each of the upper shield and the lower shield is made from a continuous closed metal layer. Thus, an embodiment of the present invention provides satisfactory transmission characteristics. In another embodiment of the present invention, a single hole is formed in each area between adjacent columns in the left and the right linear arrays of columns. Thus, another embodiment of the present invention suppresses effects on the transmission characteristics. In an embodiment of the present invention, the transmission line includes an electrically conductive line for transmitting read-back signals and an electrically conductive line for transmitting write signals; and, the lower shield extends between the electrically conductive line for transmitting read-back signals and the gimbal and between the electrically conductive line for transmitting write signals and the gimbal. Thus, an embodiment of the present invention reduces the transmission losses in the transmitting read-back signals and write signals.

In accordance with embodiments of the present invention, a signal transmission line structure provides for efficient transmission of high-frequency signals to a head-slider applying electromagnetic waves to a magnetic-recording disk to assist magnetic recording without interfering with the movement of a suspension supporting the head-slider and allowing the desired flight of the head-slider.

An embodiment of the present invention includes a transmission line structure for transmitting high-frequency signals to the head-slider. In accordance with embodiments of the present invention, the head-slider includes a magnetic pole for generating a magnetic-recording field which changes the magnetization direction of a magnetic-recording layer of a magnetic-recording medium, and a magnetic-recording assistance element for generating a high-frequency electromagnetic field to be applied to the magnetic-recording layer. The high-frequency electromagnetic field assists the magnetic recording fields generated by a magnetic pole to change the magnetization direction. In an embodiment of the present invention, assisting high frequency electromagnetic fields are microwaves. In another embodiment of the present invention, microwaves are electromagnetic waves, which provide signal waves, from 3 GHz to 300 GHz. In an embodiment of the present invention, electromagnetic waves from 10 GHz to 50 GHz may also be used.

In accordance with embodiments of the present invention, energy from a high frequency electromagnetic field increases the potential energy of a magnetic recording layer to readily change the magnetization direction responsive to a magnetic recording field from a magnetic pole. In one embodiment of the present invention, an assisting electromagnetic field allows a magnetic-recording field from the magnetic pole to change in accordance with write signals to change the magnetization direction in a magnetic-recording layer of high coercivity so that a hard-disk drive (HDD) with high magnetic-recording density is provided.

In accordance with embodiments of the present invention, a transmission line for transmitting high-frequency signals to a magnetic-recording assistance element generating an assisting electromagnetic field is formed on a suspension supporting a head-slider. In an embodiment of the present invention, the transmission line includes an electrically conductive line for transmitting high-frequency signals and upper and lower shields sandwiching the electrically conductive line between the upper and lower shields. In another embodiment of the present invention, the transmission line further includes a plurality of columns connecting the electrically conductive upper and lower shields. In yet another embodiment of the present invention, the plurality of columns is arranged along the direction of signal transmission, which extends in the direction of the electrically conductive line, at both a left side and a right side of the electrically conductive line. In one embodiment of the present invention, the plurality of columns is made of electrically conductive material and connects electrically and physically the upper shield and the lower shield.

In accordance with embodiments of the present invention, the electrically conductive line for transmitting high-frequency signals located between the upper shield and the lower shield and the plurality of columns arranged at left and right sides for connecting the upper and lower shields provide for precise and efficient transmission of the high-frequency signals on the electrically conductive line and the effective reduction of interference with the pitch motion and the roll motion of the suspension form a conductor structure around the electrically conductive line.

Transmission line structures for transmitting high-frequency signals to a head-slider are subsequently described; but, first, in accordance with embodiments of the present invention, the configuration of a HDD is next described.

Figure 1:
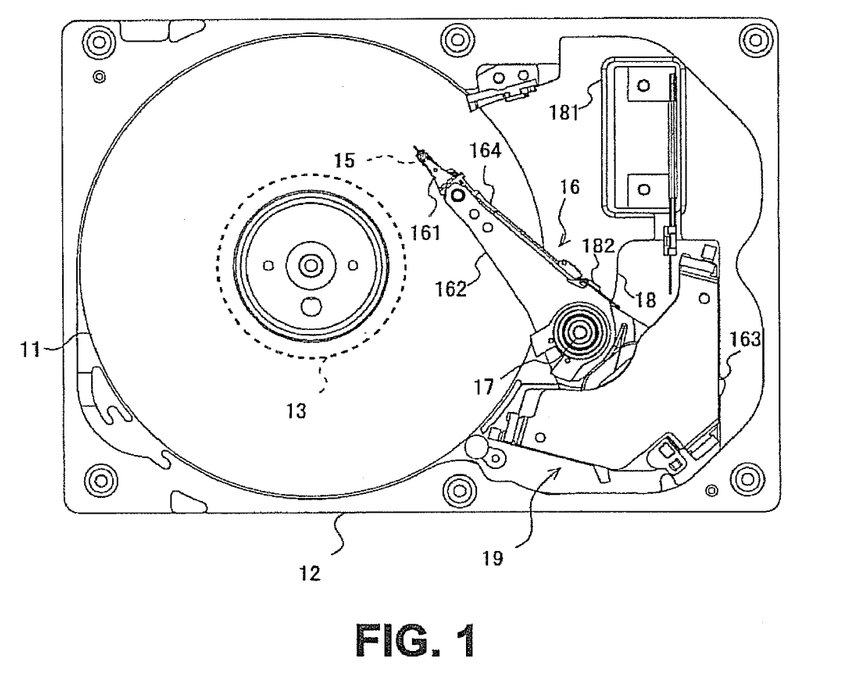
FIG. 1 is a plan view of an example configuration of a hard-disk drive (HDD), in accordance with an embodiment of the present invention.

With reference now to FIG. 1, in accordance with an embodiment of the present invention, the structure of a HDD 1 is shown. FIG. 1 is a top view illustrating the configuration of a HDD 1. A magnetic-recording disk 11, which provides a disk upon which to record data, is a nonvolatile storage device for storing data by magnetizing a magnetic-recording layer. A base 12 is affixed to a cover (not shown) for closing a top opening of the base 12 with a gasket (not shown) interposed therebetween. A disk enclosure (DE) includes the base 12 that is affixed to the cover; the disk enclosure (DE) houses components of the HDD 1. A spindle motor (SPM) 13 affixed to an inner bottom surface of the base 12 spins the magnetic-recording disk 11 at a specific angular velocity. A head-slider 15 to access the magnetic-recording disk 11 includes a magnetic-recording head including a read element and/or a write element and a slider on which the magnetic-recording head is formed.

With further reference to FIG. 1, in accordance with an embodiment of the present invention, an actuator 16 supports and moves the head-slider 15. The actuator 16 is mounted on a pivot shaft 17 and includes a voice coil motor (VCM) 19, which is a drive mechanism to drive the actuator 16. The actuator 16 includes a suspension 161, an arm 162 and a coil support 163 connected in this order from the distal end at which the head-slider 15 is coupled to the actuator 16. The head-slider 15 moves along a nominally radial direction of a recording surface of the magnetic-recording disk 11 with the rotation of the actuator 16. The pressure generated on the air-bearing surface (ABS) of the slider facing the magnetic-recording disk 11 balances the pressure applied toward the magnetic-recording disk 11 by the suspension 161 allowing the head-slider 15 to fly in proximity to the recording surface of the magnetic-recording disk 11 at a certain fly height.

With further reference to FIG. 1, in accordance with an embodiment of the present invention, a transmission line 164 formed on the actuator 16 transmits signals for the head-slider 15. The transmission line 164 is electrically connected to the head-slider 15 at one end and electrically connected to a flexible printed circuit (FPC) 18 at the other end where a preamplifier IC 182 is mounted. The FPC 18 is connected in a circuit to a control circuit board mounted on a back side of the base 12 through connector 181. The FPC 18 transmits signals between the preamplifier IC 182 and a control circuit of the control circuit board. The control circuit on the control circuit board performs the operational control and signal processing for the HDD 1. The FPC 18 transmits power and control signals to the preamplifier IC 182 as well as read-back signals, write signals, and high-frequency signals for magnetic-recording assistance provided by the magnetic-recording assistance element.

With further reference to FIG. 1, in accordance with an embodiment of the present invention, the transmission line 164 transmits signals between the head-slider 15 and the preamplifier IC 182. In accordance with embodiments of the present invention, the transmission line 164 is integrally formed with the suspension 161, protrudes from the suspension 161 and extends along a surface of the arm 162 facing toward a direction, in which the actuator 16 swings when rotated, at a side opposite from the side facing the spindle of the magnetic-recording disk 11. In embodiments of the present invention, the HDD 1 includes the transmission line 164, a structure of which is subsequently described.

Figure 2:
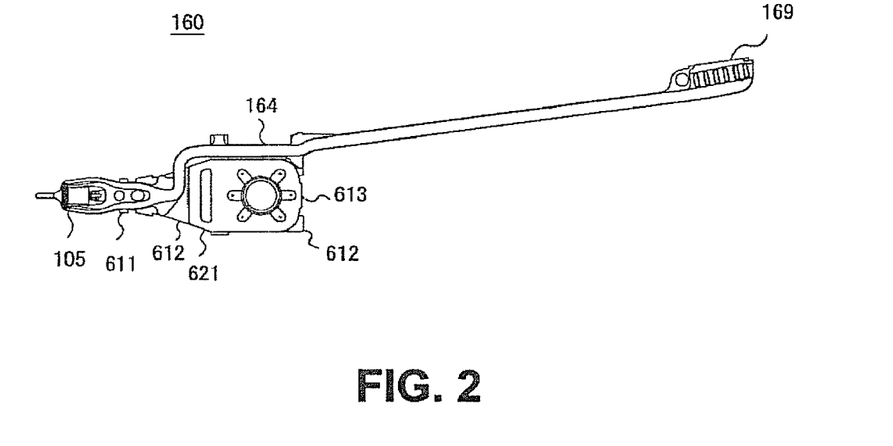
FIG. 2 is a plan view of an example head-gimbal assembly (HGA), in accordance with an embodiment of the present invention.

With reference now to FIG. 2, in accordance with an embodiment of the present invention, a plan view is shown of a HGA 160, an assembly of the suspension 161 and the head-slider 15. FIG. 2 illustrates a side of the HGA 160 facing a recording surface of the magnetic-recording disk 11. The suspension 161 includes a gimbal 611, a load beam 612, and a mount plate 613. The load beam 612 includes a hinge portion 621 functioning as a spring to press the head-slider 15 toward the magnetic-recording disk 11. The load beam 612 possesses stiffness sufficient to support the gimbal 611 in a stable position. The base plate 613 possesses stiffness sufficient to secure the load beam 612 to the arm 162. The gimbal 611 is made of, for example, stainless steel, and possesses suitable elasticity. At the front of the gimbal 611, a tongue-like gimbal tongue is formed. The head-slider 15 is coupled to the gimbal tongue with, for example, an epoxy resin of low elasticity. The gimbal tongue tilts the head-slider 15 in the pitch direction and the roll direction on a dimple of the load beam 612.

With further reference to FIG. 2, in accordance with an embodiment of the present invention, a portion of the transmission line 164 is formed on the gimbal 611 and another portion, referred to as a tail portion, extends rearward from an end of the gimbal 611. The tail portion extends from the side of the gimbal 611 opposite from the spindle of the magnetic-recording disk 11. The tail portion extending from the gimbal 611 extends along sides of the load beam 612 and arm 162, which are the sides opposite from the center of the magnetic-recording disk 11, toward the pivot shaft 17 towards the rear of the actuator. A multi-connector 169 includes the distal end of the tail portion; and, the multi-connector 169 is connected electrically and physically to a substrate on which the preamplifier IC 18 is mounted.

In accordance with an embodiment of the present invention, the structure of the magnetic-recording head with a magnetic-recording assistance element applying magnetic-recording-assisting electromagnetic waves to a magnetic-recording layer is subsequently described referring to FIG. 3. The magnetic-recording assisted by a high-frequency electromagnetic field is applicable to both longitudinal magnetic-recording HDDs in which the magnetic-recording magnetization is directed in the in-plane direction of a magnetic recording layer and perpendicular-magnetic-recording (PMR) HDDs in which the magnetic-recording magnetization is directed perpendicularly to the magnetic-recording layer. For higher magnetic-recording density, however, the PMR scheme is superior; and, embodiments of the present invention include the PMR scheme. The PMR scheme employs a medium with the easy axis of magnetization perpendicular to the recording surface. On a substrate, a magnetic thin film which forms a magnetic recording layer is deposited. The magnetic-recording field from the main magnetic pole acts on the magnetic-recording medium to change the magnetization direction of the magnetic-recording layer.

Figure 3:
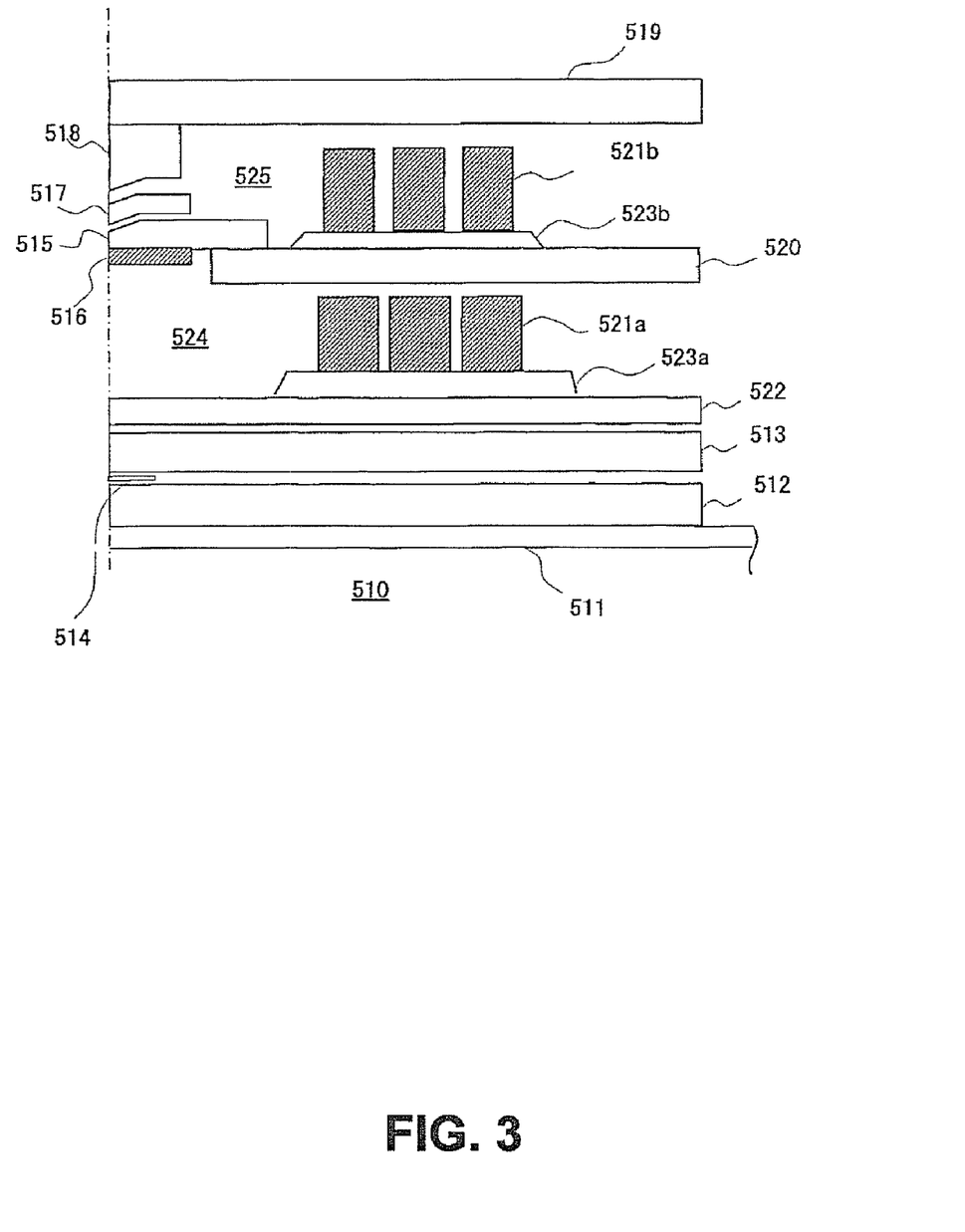
FIG. 3 is a cross-sectional view of an example magnetic-recording head, in accordance with an embodiment of the present invention.

With reference now to FIG. 3, in accordance with an embodiment of the present invention, a cross-sectional view is shown that illustrates the structure of a magnetic-recording head. The magnetic-recording head is formed on a slider 510. The read element basically includes an insulating layer 511 provided on the slider 510, a lower shield 512, an upper shield 513, and a sensor element 514 to detect magnetic information. A write element is formed above the read element. A layer that has been deposited later in a thin-film fabrication process employed to fabricate the magnetic-recording head is located towards the upper side of FIG. 3, and in the present example, the trailing-edge side is identified with the upper side.

With further reference to FIG. 3, in accordance with an embodiment of the present invention, the write element of the magnetic-recording head having the configuration shown in FIG. 3 is next described. The main pole 515 of the write element is provided within a parallel-flat-plate capacitor that provides the magnetic-recording assistance element. The electrode 516 is disposed towards the leading-edge side, and the electrode 517 is disposed towards the trailing-edge side. The track width (TW) is defined by the width of the main pole 515 exposed at the ABS. The width of the main pole 515 on the ABS side is not more than 50 nanometers (nm), which is an appropriate size for high density magnetic-recording of information. As shown in FIG. 3, one embodiment of the present invention utilizes an assisting high-frequency electromagnetic field from a parallel-flat-plate capacitor as an electromagnetic field generating means. For the parallel flat plates, non-magnetic electrically conductive films are used; for example, Al films of 50 nm in thickness may be used for the parallel flat plates. On a surface of the main pole 515, the flat-plate electrode 517 is formed with an insulating alumina film interposed between the main pole 515 and the flat-plate electrode 517. The film thickness of this alumina film defines the spacing between the parallel flat plates. For example, the thickness of the alumina film is 30 nm. Above the main pole 515, a soft magnetic film 518 is provided with the flat-plate electrode 517 interposed between the main pole 515 and the flat-plate electrode 517. The soft magnetic film 518 is magnetically connected to a soft magnetic film 519 to form a closed magnetic path. The soft magnetic film 519 is provided closer to a lower magnetic layer 520 at rear end of the soft magnetic film 519 and is magnetically connected to form a closed magnetic circuit portion at a back-gap. The lower magnetic layer 520 and the main pole 515 are also magnetically connected.

With further reference to FIG. 3, in accordance with an embodiment of the present invention, looping through the closed magnetic circuit provided by these layers, a coil 521b is placed. In addition, between the soft magnetic film 522 and the lower magnetic layer 520, another coil 521a is provided. To ensure electrical insulation between these coils and the magnetic films, insulating layers 523a, 523b, 524, and 525 are provided. The electrical current flowing through the coil 521b provides the magnetic flux introduced from the soft magnetic film 519 to the main pole 515 through the lower magnetic layer 520. Simultaneously, the electrical current flowing through the coil 521a provides the lower magnetic flux introduced from the soft magnetic film 522 to the main pole 515 through the magnetic-recording medium.

With further reference to FIG. 3, in accordance with an embodiment of the present invention, the transmission line 164 transmits signals to the flat-plate electrode pair 516 and 517, a high frequency exciting circuit element, as well as signals to the write element and the read element on the head-slider 15. The transmission line 164 transmits signals with a high frequency as an assisting electromagnetic field for the flat-plate electrode pair 516 and 517 to generate an assisting electromagnetic field. In accordance with one embodiment of the present invention, the transmission line 164 includes a transmission line structure for high-frequency signals to the magnetic-recording assistance element that generates assisting electromagnetic fields, which includes the flat-plate electrode pair 516 and 517. The structure of the transmission line 164 is next described in detail.

With reference now to FIGS. 4(a), 4(b) and 4(c), in accordance with embodiments of the present invention, a plan view illustrating the structure of a portion of the transmission line 164 is shown in FIG. 4(a); in FIG. 4(b), a cross sectional view is shown of the transmission line 164 at the b-b cutting plane line of FIG. 4(a); and, in FIG. 4(c), a cross sectional view is shown of the transmission line 164 at the c-c cutting plane line of FIG. 4(a). The transmission line 164 includes at least an electrically conductive line pair 641a and 641b transmitting write signals, an electrically conductive line pair 642a and 642b transmitting read-back signals and an electrically conductive line pair 643a and 643b transmitting high-frequency signals for generating assisting electromagnetic fields. This wiring structure of the transmission line 164 may be formed by a photolithography etching technique, as is known in the art.

With further reference to FIGS. 4(b) and 4(c), in accordance with embodiments of the present invention, both the structure of a transmission line portion 661 for write signals and the structure of a transmission line portion 662 for read-back signals is that of a microstrip structure. Specifically, the structures of transmission line portions 661 and 662 have a stainless steel layer 644 such that a portion of the gimbal 611 includes the stainless steel layer 644, a polyimide insulating layer 645 formed on the stainless steel layer 644 as a base, the electrically conductive line pair 641a and 641b and the electrically conductive line pair 642a and 642b, and a polyimide protective layer 646 covering the electrically conductive line pair 641a and 641b and the electrically conductive line pair 642a and 642b. The polyimide protective layer 646 is exposed and nothing further is formed on top of the polyimide protective layer 646. The structure of a transmission line portion 663 for transmitting high-frequency signals to the magnetic-recording assistance element, which includes the electrode pair 516 and 517 in FIG. 3, is different form that of the transmission line portion 661 and the transmission line portion 662. As shown in FIGS. 4(a) and 4(b), the structure of the high-frequency transmission line portion 663 includes the stainless steel layer 644, a lower shield 647, a lower polyimide insulating layer 648, electrically conductive lines 643a and 643b, an upper polyimide insulating layer 649 and an upper shield 650. The electrically conductive lines 643a and 643b transmit high-frequency differential signals to the electrode pair 516 and 517 generating assisting electromagnetic fields.

With further reference to FIGS. 4(a) and 4(c), in accordance with embodiments of the present invention, the lower shield 647 and the upper shield 650 are made of metal. As illustrated in FIGS. 4(a) and 4(c), the high-frequency transmission line portion 663 includes a plurality of columns interconnecting the lower shield 647 and the upper shield 650. In FIG. 4(a), four columns 651a, 651b, 652a and 652b are illustrated. The columns 651a, 651b, 652a and 652b are made of metal and connect electrically and physically the lower shield 647 and the upper shield 650 to maintain the lower shield 647 and the upper shield 650 at the same voltage. The electrically conductive lines 643a and 643b are separated from metal layers around the electrically conductive lines 643a and 643b and areas between electrically conductive lines 643a and 643b and the surrounding metal layers are filled with insulating material, which may include polyimide. Specifically, the lower polyimide insulating layer 648 is present between the electrically conductive lines 643a and 643b and the lower shield 647, providing electrical isolation between the electrically conductive lines 643a and 643b and the lower shield 647. Similarly, the upper polyimide insulating layer 649 is provided between the electrically conductive lines 643a and 643b and the upper shield 650, providing electrical isolation between the electrically conductive lines 643a and 643b and the upper shield 650. The upper polyimide insulating layer 649 is present between the electrically conductive lines 643a and 643b and each of the plurality of columns 651a, 651b, 652a and 652b to insulate the electrically conductive lines 643a and 643b and each of the plurality of columns 651a, 651b, 652a and 652b from each other.

Figure 4:
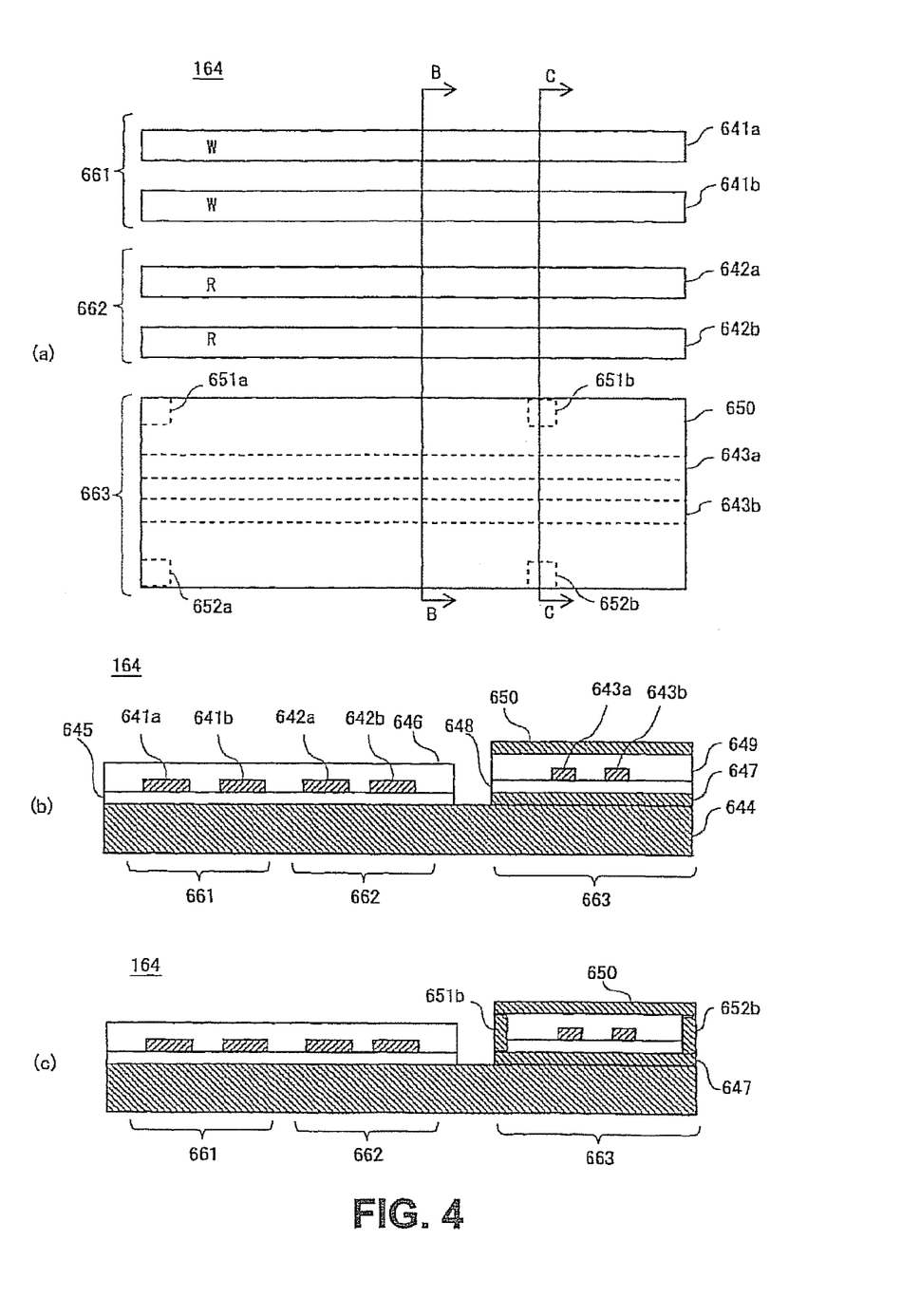
FIGS. 4(a), 4(b) and 4(c) are, respectively, a plan view and two cross-sectional views through respective cutting planes b-b and c-c of FIG. 4(a) of an example portion of a transmission line, in accordance with an embodiment of the present invention.

With further reference to FIGS. 4(*a*), 4(*b*) and 4(*c*), in accordance with embodiments of the present invention, the lower shield 647 is formed directly on the stainless steel layer 644; and, the lower shield 647 and the stainless steel layer 644 are at the same voltage because the lower shield 647 and the stainless steel layer 644 are in electrical contact. The stainless steel layer 644 acts as a ground; and, the lower shield 647 electrically and physically connected to the stainless steel layer 644 is also grounded. Since the upper shield 650 is electrically and physically connected to the lower shield 647 by the columns 651a, 651b, 652a and 652b, the upper shield 650 is also maintained at ground potential. Since the upper shield 650 and the lower shield 647 act as shields for the electrically conductive lines 643a and 643b transmitting high-frequency differential signals, in an embodiment of the present invention, the upper shield 650 and the lower shield 647 are made of high conductivity metal. A suitable material is copper. In another embodiment of the present invention, the columns 651a, 651b, 652a and 652b connecting the upper shield 650 and the lower shield 647 are made of copper. The electrically conductive lines 643a and 643b are typically made of copper. In the high-frequency transmission line portion 663 of the present configuration, the electrically conductive line pair 643a and 643b is covered by the upper shield 650 and the lower shield 647 at an upper side and a lower side, respectively. The plurality of columns is arranged at both left and right sides of the electrically conductive lines 643a and 643b.

Figure 5:
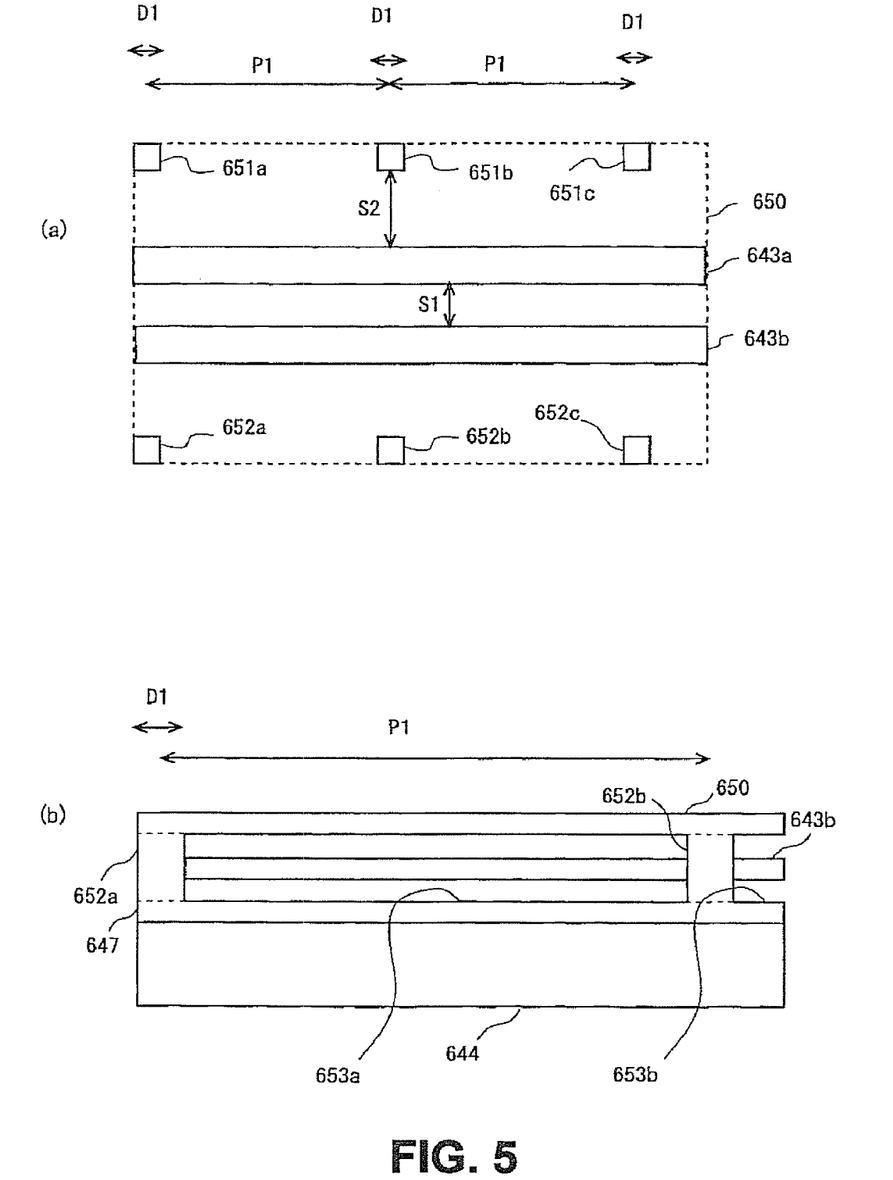
FIGS. 5(a) and 5(b) are, respectively, a plan view and a side view of an example portion of a high-frequency transmission line, in accordance with an embodiment of the present invention.

With reference now to FIGS. 5(*a*) and 5(*b*), in accordance with an embodiment of the present invention, a top plan view illustrating a portion of the high-frequency transmission line portion 663 is shown in FIG. 5(*a*); and, in FIG. 5(*b*), a side view is shown that illustrates a portion of the high-frequency transmission line portion 663. In FIG. 5(*a*), the plurality of columns are arranged along the electrically conductive lines 643a and 643b at both left and right sides of the electrically conductive lines 643a and 643b. Three columns 651a, 651b and 651c are illustrated at one side and three columns 652a, 652b and 652c are illustrated at the other side. FIG. 5(*a*) depicts the structure of a portion of the high-frequency transmission line portion 663 and more columns are arranged in the high-frequency transmission line portion 663. The plurality of columns arranged at the right side include a right linear array 652 of columns that are arranged in a linear array of columns along the right side; and, the plurality of columns arranged at the left side include a left linear array 651 of columns that are arranged in a linear array of columns along the left side. Each of the left and right column linear arrays 651 and 652 is a single linear array. The columns 651a, 651b and 651c and the columns 652a, 652b and 652c are arranged separately along the direction in which high-frequency signals flow. As shown in FIG. 5(*b*), a single hole is formed in each area between the columns 651a, 651b and 651c arranged along the electrically conductive lines 643a and 643b. In FIG. 5(*b*), a hole 653a between the column 652a and the column 652b, and a hole 653b between the column 652b and the column 652c are shown. The holes 653a and 653b are filled with polyimide.

With further reference to FIGS. 5(*a*) and 5(*b*), in accordance with an embodiment of the present invention, the upper shield 650 and the lower shield 647 interconnected by the plurality of columns reduce the stiffness of the shield structure of the high-frequency transmission line portion 663 to reduce interference with the motion of the gimbal 611. In an embodiment of the present invention, the motion of the gimbal 611 exhibits flexibility of the motion along the direction vertical to a recording surface such as pitch motion and roll motion, namely the motion along the direction of the spindle of the magnetic-recording disk 11. The plurality of separate columns, which are a linear array of columns, connecting the upper shield 650 and the lower shield 647 are formed at each of the left and right sides in the shield structure surrounding the electrically conductive lines 643a and 643b for transmitting high-frequency signals. Accordingly, flexibility of the high-frequency transmission line portion 663 in the direction of the spindle of the magnetic-recording disk 11 is provided to prevent interference with the motion of the gimbal 611.

With further reference to FIGS. 5(*a*) and 5(*b*), in accordance with an embodiment of the present invention, the left and right shields are not formed of continuous metal layers, because both sides are not closed completely; and, holes are formed in both sides. Thus, the discontinuous metal layers of the left and right shields could seriously affect the transmission characteristics of high-frequency signals, and, in particular, cause a transmission loss. Therefore, in an embodiment of the present invention, the columns are designed to adequately reduce transmission loss and not to substantially affect the transmission of high-frequency signals. In order to reduce effects on signals, in an embodiment of the present invention, the left linear array of columns and the right linear array of columns are symmetrical. Namely, in an embodiment of the present invention, the left and the right linear arrays of columns consist of columns of the identical shape and have the identical arrangement pitch, which is a distance between the centers of adjacent columns. Furthermore, in an embodiment of the present invention, the arrangement pitch is constant.

With further reference to FIGS. 5(*a*) and 5(*b*), in accordance with an embodiment of the present invention, the inventors have found that a functional relationship between the width of a column, D1, and the pitch between columns, P1, strongly affects the transmission loss. As illustrated in FIGS. 5(*a*) and 5(*b*), the width of a column, D1, is a dimension of a column in the signal transmission direction along the electrically conductive lines 643a and 643b. The pitch, P1, is a distance between columns arranged in a linear array of columns and the distance between the centers of adjacent columns. In the structure in FIG. 5(*a*), all the columns have the identical shape. The shape of the columns is a right prism and the cross section vertical to the upper-lower direction is a square or rectangle. The left and right linear arrays of columns 651 and 652 have the same pitch, P1, which is constant. The corresponding columns in the left and the right linear array are located just opposite each other. The center positions of the columns in the left and the right linear array are identical in the direction along the electrically conductive lines 643a and 643b. Generally, if right prisms are formed by etching and plating, corners of a right prism have a round shape with a curvature radius, r. As is known in the art, the effect of the curvature is negligible. Thus, the cross section may be regarded as a square or a rectangle.

With further reference to FIGS. 5(*a*) and 5(*b*), in accordance with an embodiment of the present invention, the inventors have studied in detail the structure of columns in the column linear arrays 651 and 652. As a result, in an embodiment of the present invention, the ratio of the width of a column, D1, to the pitch of a linear array of columns, P1, which is given by D1/P1, has been found to be a factor in performance of the transmission line. In an embodiment of the present invention, the ratio, D1/P1, is 0.1 (10%) or less. If the ratio, D1/P1, is no more than 0.1, the transmission characteristics of the transmission line are not largely diminished and are maintained within a suitable range. If the ratio, D1/P1, is greater than 0.1, the width of a column, D1, strongly affects the transmission characteristics. Joule heating generated by induced currents in columns attending the transmission of high-frequency signals is the main factor affecting the transmission characteristics.

Figure 6:
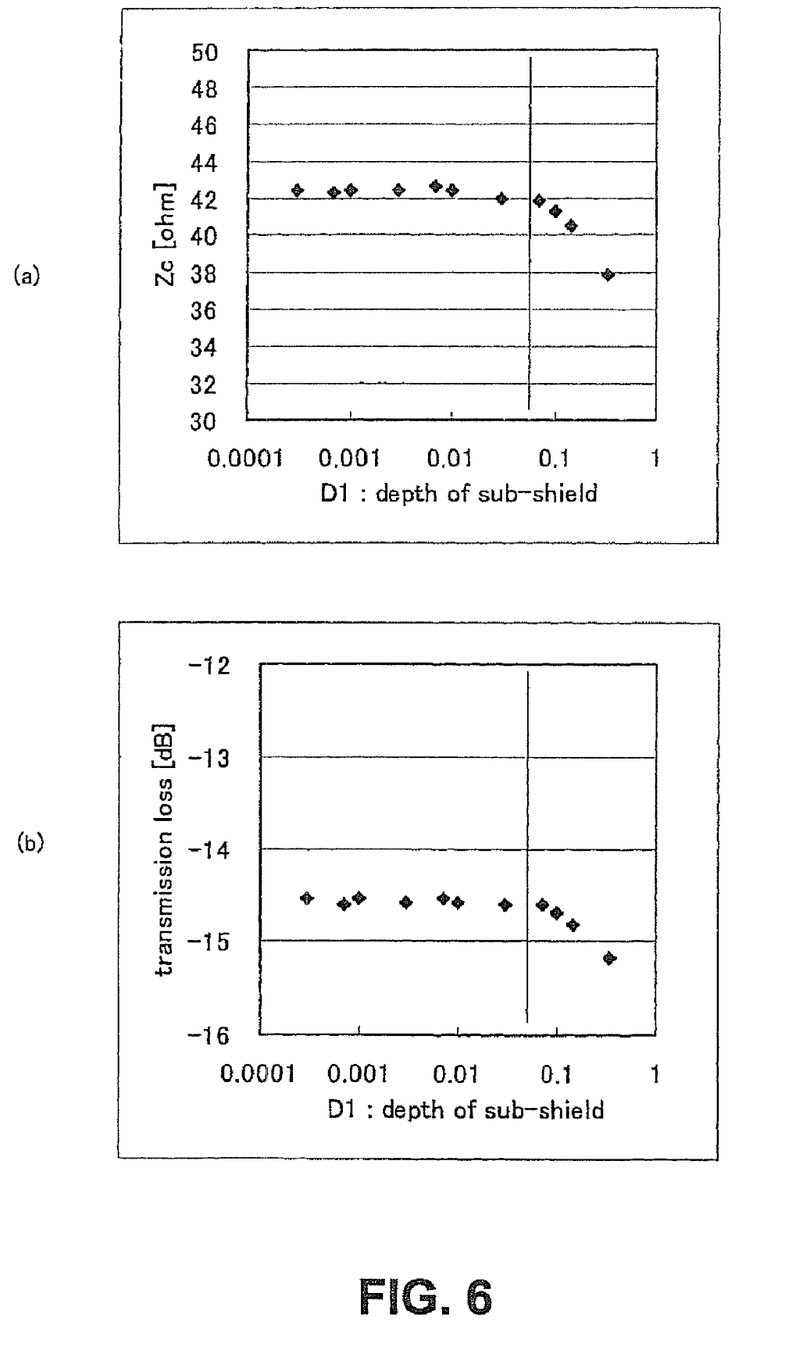
FIGS. 6(a) and 6(b) are, respectively, plots of simulation results for impedance and transmission loss of the portion of the high-frequency transmission line illustrated in FIGS. 5(a) and 5(b), in accordance with an embodiment of the present invention.

With reference now to FIGS. 6(a) and 6(b), in accordance with an embodiment of the present invention, the results of a simulation conducted by the inventors are shown. FIG. 6(a) depicts the functional relationship between the ratio of the width of a column, D1, to the pitch of a linear array of columns, P1, which is given by D1/P1, and the characteristic impedance. FIG. 6(b) depicts the functional relationship between the ratio, D1/P1, and the transmission loss. In the simulation, the pitch, P1, of the linear array of columns was 0.5 millimeters (mm); the spacing, S1, between the electrically conductive lines was 0.01 mm; the spacing, S2, between the electrically conductive lines and the linear arrays of columns each was 0.005 mm. In the two graphs, if the ratio, D1/P1, is greater than 0.1 (10%), the characteristic impedance and the transmission loss, which are identified with the transmission characteristics, greatly change. Specifically, the characteristic impedance reduces in FIG. 6(a) and the transmission loss increases in FIG. 6(b). This simulation results agree with the above-described effects of the ratio, D1/P1.

With further reference to FIGS. 5(a) and 5(b), in accordance with an embodiment of the present invention, each column in the left and right linear arrays is located just in front of the opposite column. Namely, the columns in the left linear array 651 and the right linear array 652 are formed at the identical positions in the direction along the electrically conductive lines 643a and 643b. On the other hand, columns may be arranged in left and right linear arrays in a staggered configuration, as is next described.

Figure 7:
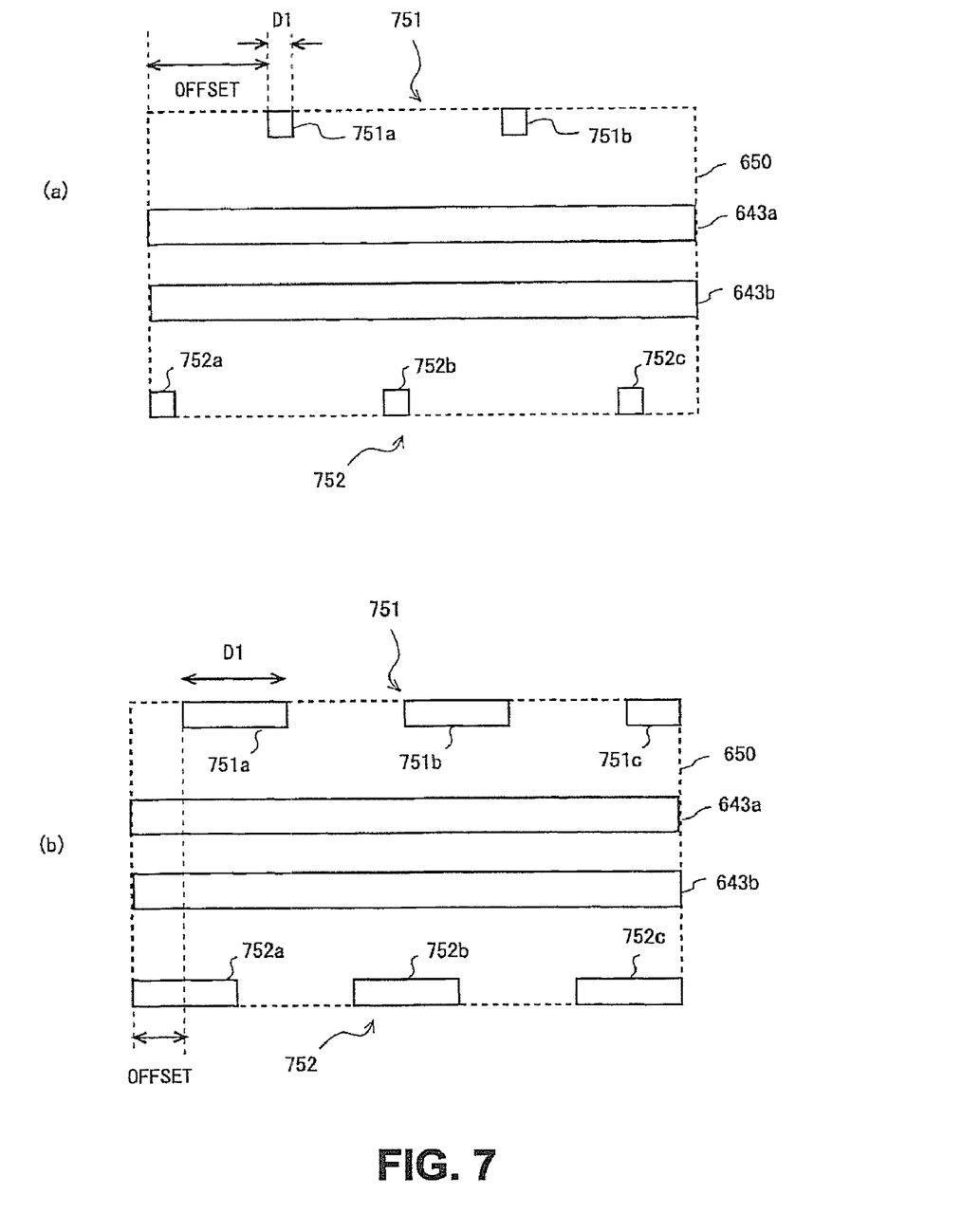
FIGS. 7(a) and 7(b) are, respectively, a plan view and a side view of another example portion of a high-frequency transmission line, in accordance with an embodiment of the present invention.

With reference now to FIGS. 7(a) and 7(b), in accordance with an embodiment of the present invention, an example of a staggered configuration of the plurality of columns is shown. In an embodiment of the present invention, the column arrangement illustrated in FIG. 5(a) provides simplicity of design and manufacturability. However, in another embodiment of the present invention, the offset may be changed between the left and right linear arrays to adjust the stiffness of the high-frequency transmission line portion to provide compatibility between efficient and precise high-frequency transmission and low stiffness. Specifically, in the structure illustrated in FIG. 7(a), columns in left and right linear arrays 751 and 752 are completely displaced when viewed in the direction vertical to the electrically conductive lines 643a and 643b. Namely, the offset between a column in one linear array and the corresponding column in the other linear array is larger than the width of a column, D1. Columns, which are completely displaced and prevented from overlapping in a staggered arrangement, reduce the stiffness of the line portion. In the structure in FIG. 7(b), columns in the left and right linear arrays 751 and 752 are displaced when viewed in the direction vertical to the electrically conductive lines 643a and 643b and columns opposite to each other partially overlap. Namely, an offset is present between a column in one linear array and the corresponding column in the other linear array; but, the offset is smaller than the width of the column, D1.

Figure 8:
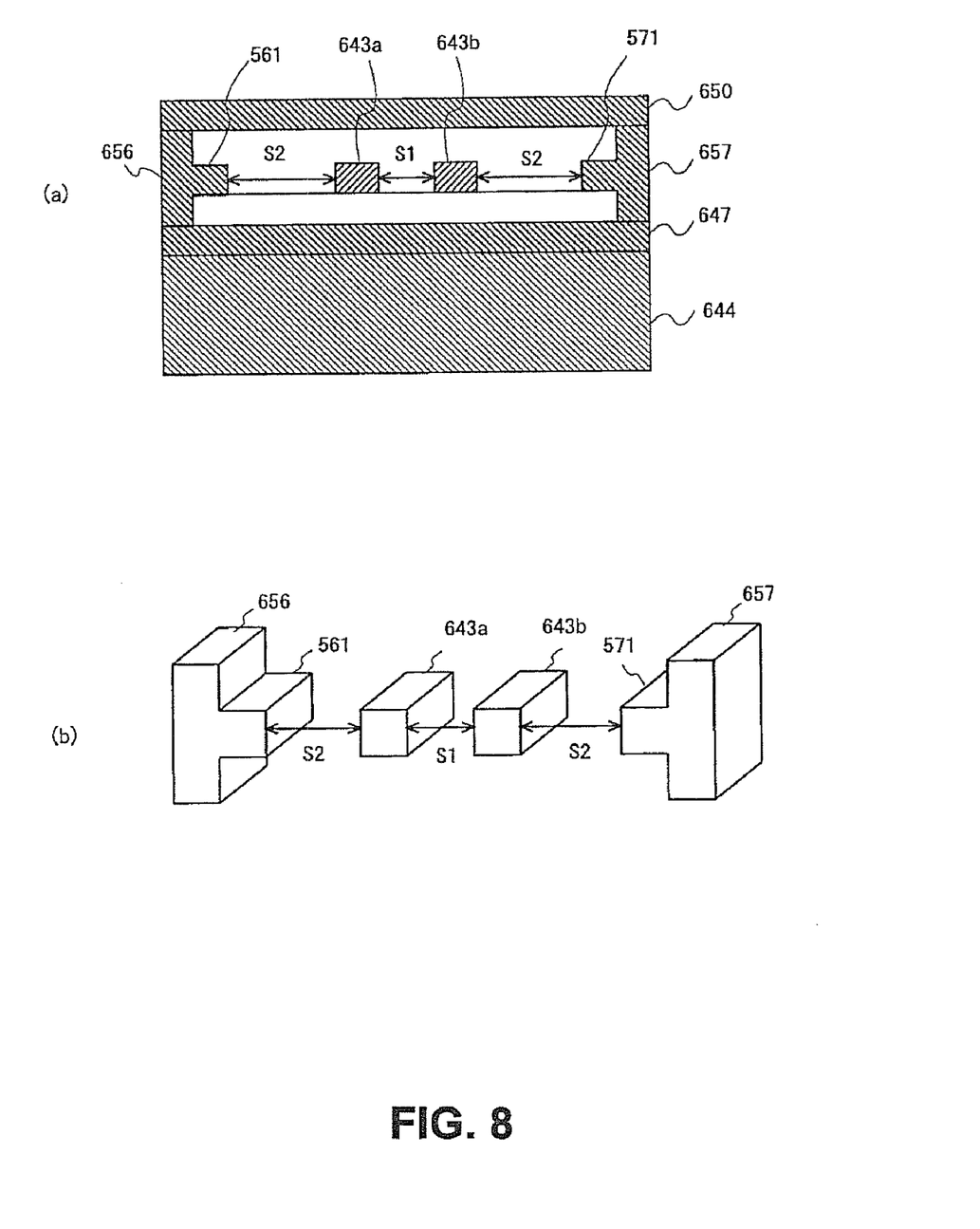
FIGS. 8(a) and 8(b) are, respectively, a cross-sectional view and a perspective view of another example portion of a high-frequency transmission line, in accordance with an embodiment of the present invention.

With reference now to FIGS. 8(a) and 8(b), in accordance with an embodiment of the present invention, a high-frequency transmission line portion with columns of different shape from the above columns is illustrated. In FIG. 8(a), a cross sectional view at a column portion is shown; and, in FIG. 8(b), a perspective view is shown that illustrates a portion including columns. In FIG. 8(b), only electrically conductive lines and columns are illustrated and the other elements of the structure are not shown. The side view and the plan view of the structure are similar to the side view and the plan view shown in FIGS. 5(a) and 5(b). The columns 656 and 657 in this structure have protruding portions 561 and 571 on the inner sides, respectively. In the drawing, each of the protruding portions 561 and 571 is a rectangular parallelepiped. The surfaces of the protruding portions 561 and 571 facing the electrically conductive lines 643a and 643b are parallel to the electrically conductive lines 643a and 643b. The spacing between the electrically conductive lines 643a and 643b is designated by, S1. Each of the spacings between the electrically conductive lines 643a and 643b and the protruding portions 561 and 571 is designated by, S2. The spacing between the electrically conductive line 643a and the protruding portion 561 and the spacing between the electrically conductive line 643b and the protruding portion 571 are an identical spacing, S2.

With further reference to FIGS. 8(a) and 8(b), in accordance with an embodiment of the present invention, the inventors have studied the relationship between electrically conductive lines and linear arrays of columns in various structures. As a result, in an embodiment of the present invention, the relationship between the spacing, S1, between electrically conductive lines and the spacing, S2, between an electrically conductive line and a linear array of columns has been found to be a factor in the performance of the transmission line. If the spacing, S2, between an electrically conductive line and a linear array of column is reduced, the transmission characteristics of a transmission line become more susceptible to linear arrays of columns. In order to reduce the detrimental effect to the transmission characteristics from linear arrays of columns, in an embodiment of the present invention, the spacing, S2, between a electrically conductive line and a linear array of columns is no less than the spacing, S1, between electrically conductive lines.

Figure 9:
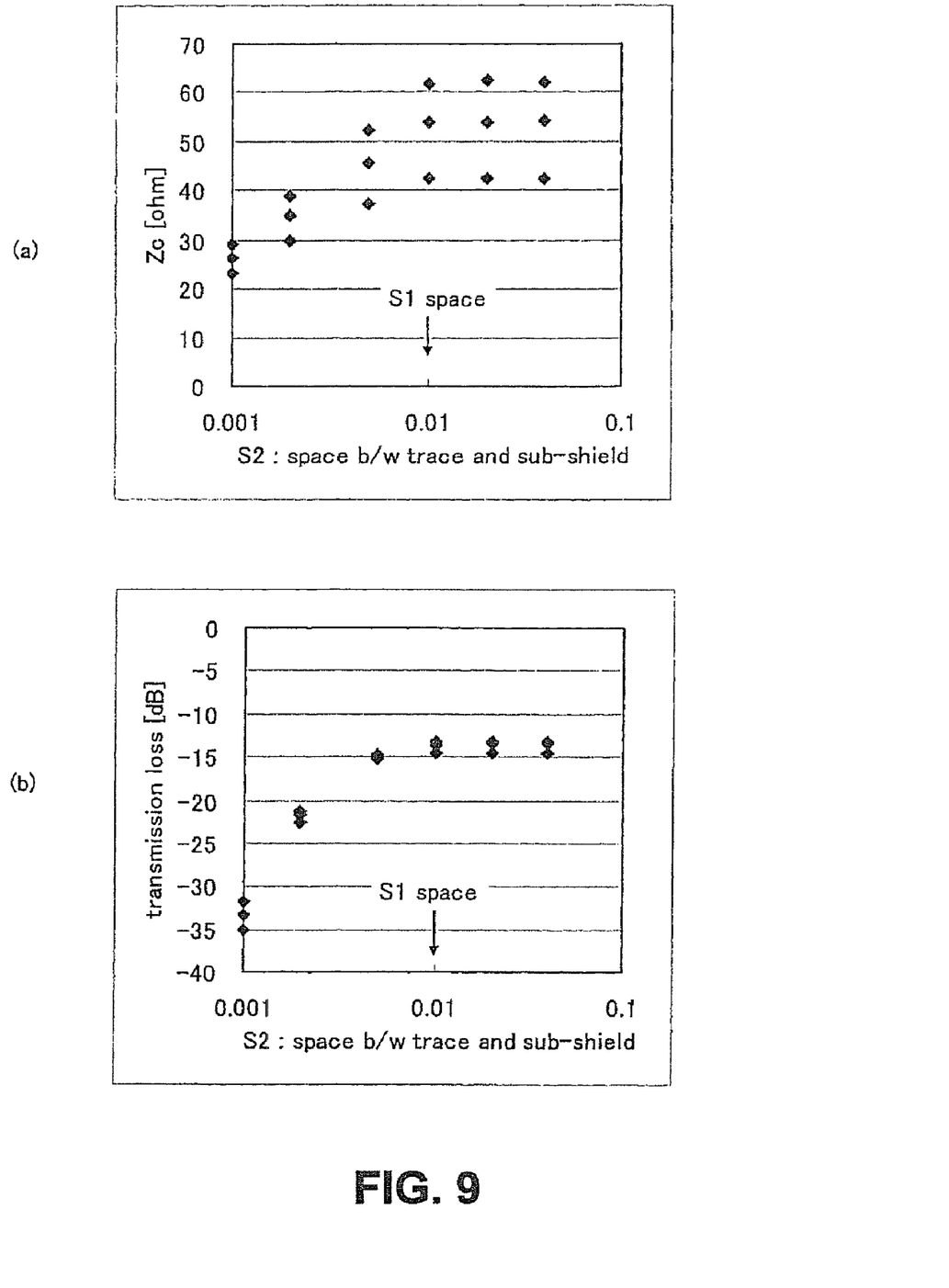
FIGS. 9(a) and 9(b) are, respectively, plots of simulation results for impedance and transmission loss of the portion of the high-frequency transmission line illustrated in FIGS. 8(a) and 8(b), in accordance with an embodiment of the present invention.

With reference now to FIGS. 9(a) and 9(b), in accordance with an embodiment of the present invention, results of another simulation conducted by the inventors are shown. A transmission line structure used in the simulation is substantially the same as the structure illustrated in FIGS. 8(a) and 8(b). The graphs in FIGS. 9(a) and 9(b) show the result of a simulation which measured the characteristic impedance and the transmission loss obtained with changing the spacings, S2, between the electrically conductive lines and the linear arrays of columns as the other parameters were maintained constant. FIG. 9(a) shows the functional relationship between the characteristic impedance and the spacing, S2. FIG. 9(b) shows the functional relationship between the transmission loss and the spacing, S2. The two graphs show that when the spacing, S2, is reduced below the spacing, S1, the characteristic impedance decreases and the transmission loss increases. The two graphs show that if the spacing, S2, is smaller than the spacing, S1, the relationship between the columns 656 and 657 and the electrically conductive lines 643a and 643b strongly affects the transmission characteristics, which includes the characteristic impedance and the transmission loss, of the high-frequency transmission line portion 663. The simulation results agree with the above description concerning the spacings, S1 and S2.

With further reference to FIGS. 9(a) and 9(b), in accordance with an embodiment of the present invention, the relationship between the spacing, S1, and the spacing, S2, may be considered similar to the relationship between the spacing, S1, and the spacing, S2, of a high-frequency transmission line portion without protruding portions as shown in FIG. 5. Studies by the inventors show that protruding portions of columns do not strongly affect the characteristic impedance and the transmission loss of a transmission line. Accordingly, if the spacing, S2, between an electrically conductive line and a linear array of column is no less than the spacing, S1, between electrically conductive lines, the detrimental effect from columns connecting an upper shield and a lower shield to the transmission characteristics is reduced regardless of the presence or absence of protruding portions.

In accordance with another embodiment of the present invention, in order to suppress the effect on the signal transmission characteristics of an electrically conductive line pair, no other metal layers are formed between columns arranged separately along the electrically conductive lines; but, a single hole is formed. However, columns may be connected with an electrically conductive beam depending on design, as is next described.

Figure 10:
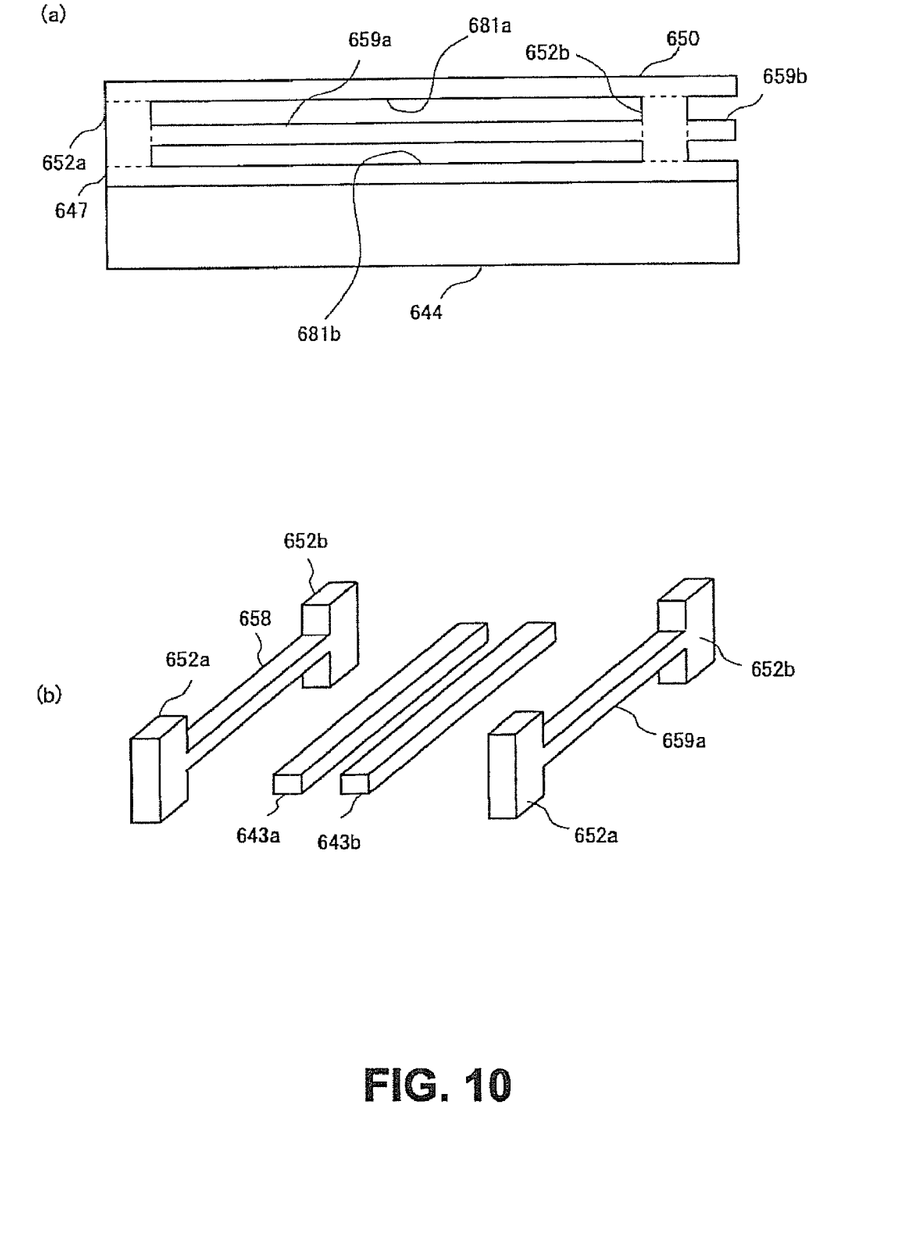
FIGS. 10(a) and 10(b) are, respectively, a cross-sectional view and a perspective view of an example portion of a high-frequency transmission line, in accordance with an embodiment of the present invention.

With reference now to FIGS. 10(a) and 10(b), in accordance with an embodiment of the present invention, a portion of a high-frequency transmission line portion with a beam connecting adjacent columns in a linear array is shown. FIG. 10(a) is a side view of the portion of the high-frequency transmission line portion; and, FIG. 10(b) is a perspective view illustrating the structure of a portion including beams. FIG. 10(b) shows only the electrically conductive lines 643a and 643b, columns 651a, 651b, 652a and 652b and beams 658, 659a and 659b and the other elements are not shown. Only a portion of the beam 659b is shown. In an embodiment of the present invention, the beams 658, 659a and 659b are made of copper like other shield metal layers. The beams 658 and 659a extend along the electrically conductive lines 643a and 643b and connect the adjacent columns 652a and 652b. The beams 658, 659a and 659b are located separately from the upper and lower shields 647 and 650. Accordingly, two holes are formed between columns as distinct from the above structure; and, a single hole 653a is formed between columns. In the example of FIG. 10(a), the beam 659a connects the separate columns 652a and 652b and two holes 681a and 681b are formed between the columns 652a and 652b.

In accordance with embodiments of the present invention, the above-described transmission line structures provide precise and efficient data transmission and low stiffness of a high-frequency signal transmission portion provided for a magnetic-recording assistance element. In accordance with embodiments of the present invention, the high-frequency transmission line extending from connectors to the head-slider 15 to the multi-connector 169 (refer to FIG. 2) includes any one of the above-described structures. Thus, if a portion of the transmission line includes any one of the above-described structures extending from the connectors to the head-slider 15 to the multi-connector 169, precise and efficient data transmission and low stiffness may be achieved.

In accordance with other embodiments of the present invention, for each of the above-described configurations, the upper shield 650 and lower shield 647 are completely closed and each of the upper shield 650 and lower shield 647 includes a continuous plate without holes. However, portions having lower stiffness may have holes to reduce the stiffness of an upper shield or a lower shield or have microstrip structure without an upper shield.

In accordance with further embodiments of the present invention, the above-described structures have the lower shield distinct from the stainless steel layer. In an embodiment of the present invention, the lower shield is made of the same metal material as the upper shield layer and the columns, and the electrical conductivity is high. Accordingly, in an embodiment of the present invention, the lower shield may be made separate from the gimbal base and made of a metal with higher conductivity than the material of the gimbal base. Otherwise, in accordance with embodiments of the present invention, the lower shield may be formed in the same layer as the gimbal base to reduce the stiffness; namely, a polyimide layer may be formed on a stainless steel layer and the stainless steel layer may be used as a lower shield.

Figure 11:
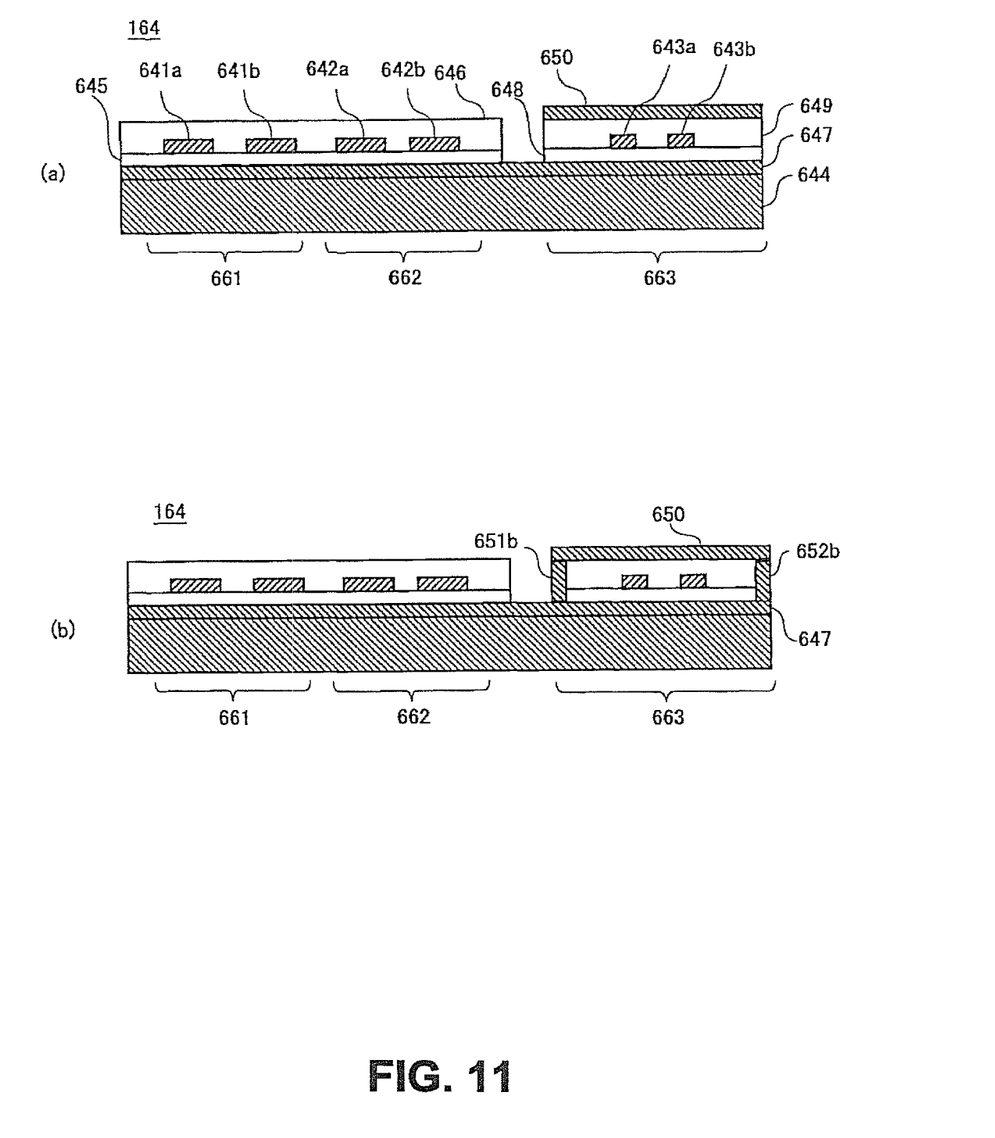
FIGS. 11(a) and 11(b) are two cross-sectional views of an example portion of another high-frequency transmission line, in accordance with an embodiment of the present invention.

With reference now to FIGS. 11(a) and 11(b), in accordance with an embodiment of the present invention, a configuration of a portion of another example high-frequency transmission line portion is shown. In accordance with an embodiment of the present invention, increased transmission loss of a transmission line portion attending higher writing and reading frequencies can be reduced. To this end, the lower shield 647 may extend in the width direction of the line to under the electrically conductive line pairs 641a and 641b and 642a and 642b of the transmission line portions for writing signals and read-back signals 661 and 662 with the polyimide insulating layer 645 interposed therebetween. In the structure, the lower shield 647 with higher conductivity than the stainless steel layer 644 reduces the transmission loss. In one embodiment of the present invention, the lower shield 647 is made of copper.

In an embodiment of the present invention, differential signals are transmitted with two electrically conductive lines arranged in a row like the above-described structures for transmitting high-frequency signals in a band of microwave frequencies. Depending on design, however, a single electrically conductive line may transmit differential signals instead of two electrically conductive lines. A return path in the structure includes a surrounding shield.

As set forth above, embodiments of the present invention have been described by way of examples; but, embodiments of the present invention are not limited to the above-described examples. A person skilled in the art may easily modify, add, or convert the components in the above-described examples within the spirit and scope of embodiments of the present invention. Embodiments of the present invention are applicable to HGAs with other elements generating assistance electromagnetic fields. For example, in one embodiment of the present invention, columns connecting an upper shield and a lower shield have the shape of a right prism; but, columns connecting an upper shield and a lower shield may have a different shape. For example, in another embodiment of the present invention, the dimensions of the transmission line structure depend on the design and are not limited to the above-described structures.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A head-gimbal assembly comprising:
a suspension;
a head-slider coupled to said suspension;
a magnetic-recording assistance element on said head-slider for applying an electromagnetic wave to a magnetic-recording disk to assist magnetic recording on said magnetic-recording disk; and
a transmission line on said suspension for transmitting signals to said magnetic-recording assistance element, said transmission line comprising:
a electrically conductive line for transmitting said signals;
an upper shield placed above said electrically conductive line along said electrically conductive line;
a lower shield placed below said electrically conductive line along said electrically conductive line; and
a plurality of columns arranged at each of a right side and a left side of said electrically conductive line along said electrically conductive line for connecting said upper shield and said lower shield, said plurality of columns arranged at said right side comprising a right linear array of columns, and said plurality of columns arranged at said left side comprising a left linear array of columns, wherein a single hole is formed in each area between adjacent columns in said left and said right linear arrays of columns.

2. The head-gimbal assembly of claim 1, wherein said plurality of columns have an identical shape; and said left linear array of columns and said right linear array of columns have an identical arrangement pitch.

3. The head-gimbal assembly of claim 2, wherein columns of said left linear array and columns of said right linear array are arranged at identical positions in a direction along said electrically conductive line.

4. The head-gimbal assembly of claim 2, wherein there is an offset in a direction along said electrically conductive line between said left linear array of columns and said right linear array of columns.

5. The head-gimbal assembly of claim 4 wherein said offset is greater than a dimension of each column in said direction along said electrically conductive line.

6. The head-gimbal assembly of claim 1, wherein a dimension of a column of said plurality of columns in a direction along said electrically conductive line is less than or equal to $1/10$ of a distance between centers of adjacent columns.

7. The head-gimbal assembly of claim 1, wherein said signals are differential signals; and two electrically conductive lines for transmitting said signals are formed on a surface between said upper shield and said lower shield.

8. The head-gimbal assembly of claim 7, wherein a spacing between said right electrically conductive line of said two electrically conductive lines and said right linear array of columns and a spacing between said left electrically conductive line of said two electrically conductive lines and said left linear array of columns are an identical spacing, S2; and a spacing, S1, between said two electrically conductive lines is no more than said spacing, S2.

9. The head-gimbal assembly of claim 1, wherein each of said upper shield and said lower shield is made from a continuous closed metal layer.

10. The head-gimbal assembly of claim 1, wherein said transmission line comprises an electrically conductive line for transmitting read-back signals and an electrically conductive line for transmitting write signals; and said lower shield extends between said electrically conductive line for transmitting read-back signals and said suspension and between said electrically conductive line for transmitting write signals and said suspension.

11. A head-gimbal assembly comprising:
a suspension;
a head-slider coupled to said suspension;
a magnetic-recording assistance element on said head-slider for applying an electromagnetic wave to a magnetic-recording disk to assist magnetic recording on said magnetic-recording disk; and
a transmission line on said suspension for transmitting signals to said magnetic-recording assistance element, said transmission line comprising:
a electrically conductive line for transmitting said signals;
an upper shield placed above said electrically conductive line along said electrically conductive line;
a lower shield placed below said electrically conductive line along said electrically conductive line; and
a plurality of columns arranged at each of a right side and a left side of said electrically conductive line along said electrically conductive line for connecting said upper shield and said lower shield, said plurality of columns arranged at said right side comprising a right linear array of columns, and said plurality of columns arranged at said left side comprising a left linear array of columns, wherein said lower shield is formed distinct from a base, a portion of said suspension comprising said base; and said upper shield, said lower shield and said plurality of columns are made of metal with higher conductivity than said base.

* * * * *